Patented Apr. 26, 1932

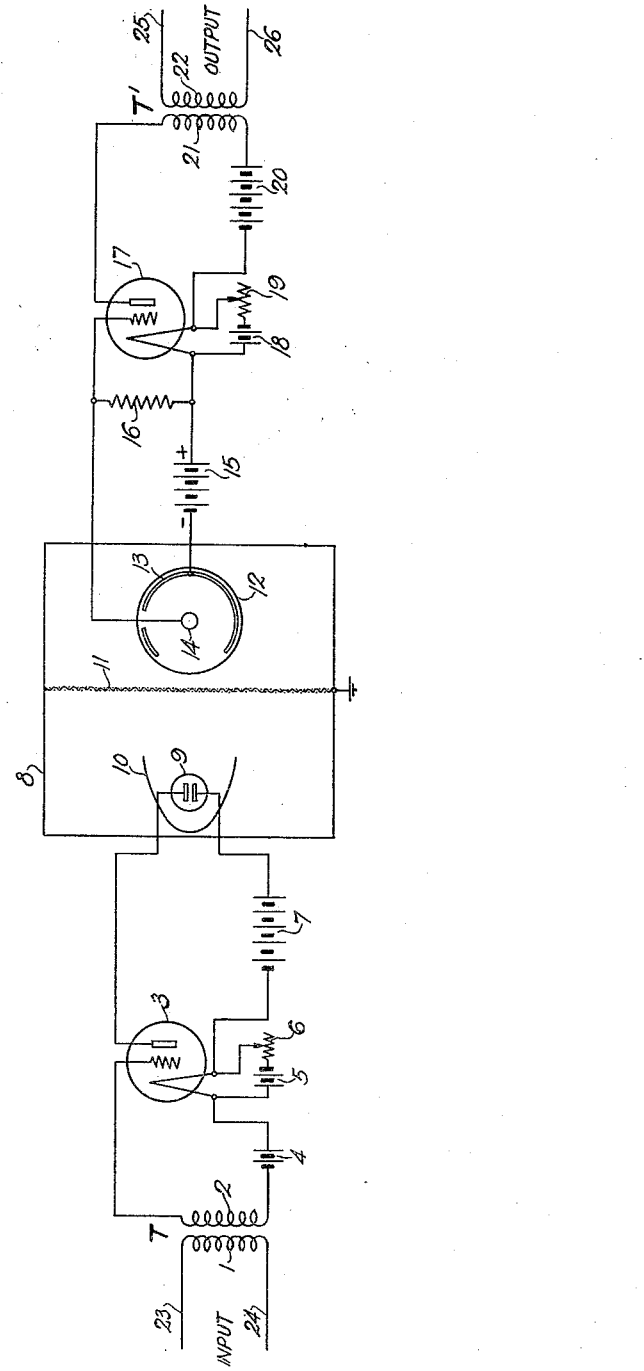

1,855,863

UNITED STATES PATENT OFFICE

HAROLD J. McCREARY, OF CHICAGO, ILLINOIS, ASSIGNOR, BY MESNE ASSIGNMENTS, TO ASSOCIATED ELECTRIC LABORATORIES, INC., OF CHICAGO, ILLINOIS, A CORPORATION OF DELAWARE

AMPLIFIER

Application filed January 11, 1930. Serial No. 420,049.

The present invention relates in general to amplifiers, and the main object of the invention is the provision of a novel form of amplifying device in which the input and output circuits are electromagnetically and electrostatically isolated from each other, thereby preventing any feed-back from the output circuit to the input circuit.

These characteristics of the invention make it especially useful as a coupling means between two successive stages of the ordinary amplifying systems using three element electron tubes. When used in this manner, the invention provides a coupling which prevents feed-back between the amplifying stages at the point where it is inserted in the system and thus renders it possible to use a much larger number of stages in tandem than has heretofore been practicable.

Other features of the invention will be apparent from the following detailed description and explanation of the operation of the same when read in connection with the accompanying drawing comprising one figure only, which shows one application of the invention by means of the usual schematic diagram.

The drawing shows two triode valve amplifiers coupled by means of a device according to the present invention. The signals to be amplified are impressed on the grid of the first amplifying tube 3 through the transformer T. The plate circuit of the tube includes the neon lamp 9. The variations in the brightness of the neon lamp affect the photoelectric cell 12 which is a part of the grid circuit of the second amplifying tube 17. Thus it is apparent that the output of the second amplifier is governed by the amount of light reaching the photo-electric cell which depends upon the plate current of the first amplifying tube.

The neon lamp 9 and the photo-electric cell are enclosed in a light-proof box 8, the inside walls of which are black to prevent any reflection of light. This box also serves as a magnetic and electrostatic shield to prevent any coupling between the two amplifiers. The neon tube is mounted in a parabolic reflector 10 which concentrates the light from the lamp on the photo-electric cell 12. The neon lamp and the photo-electric cell are separated by an electrostatic shield 11 which prevents any electrostatic coupling between the tube and the cell. This shield is preferably a copper screen but may be any other suitable device which will act as an electrostatic shield but which will allow the light from the lamp 9 to pass to the photo-electric cell.

The detailed operation of the invention will now be explained. The grid of the first amplifying tube 3 is normally biased with a negative potential by means of the battery 4. This normal bias allows a normal plate current of about one-half of the maximum value to flow through the neon lamp 9 and the battery 7. Thus the neon lamp 9 is normally burning dimly.

The incoming oscillatory current or signal which is to be amplified is taken through the primary winding 1 of the transformer T over the input conductors 23 and 24. The oscillatory current induces a corresponding varying E. M. F. in the secondary winding 2 of the transformer which is included in the grid circuit of the first amplifying tube 3. This induced E. M. F. causes the potential on the grid of the tube to be varied in accordance with the incoming signal and results in a fluctuating plate current through the neon lamp 9. This plate current causes the lamp to burn brighter and dimmer in accordance with the increases and decreases of the current.

Considering now the operation of the second amplifier. The photo-electric cell 12 is connected in series with a battery 15 and a high resistance 16. The light normally received from the neon lamp 9 allows a normal current to flow through the photo-electric cell and through the resistance 16. The voltage drop across the resistance 16 is impressed on the grid of the amplifying tube 17. The plate circuit of this tube includes the primary winding 21 of the output transformer T' and the battery 20.

As the light from the neon lamp 9 increases and decreases in accordance with the incoming signal as explained above, the photo-electric cell 12 increases and decreases its conductivity in accordance with the variations in light received by it. This, in effect, decreases and increases the resistance of the series circuit through the resistance 16 and causes corresponding fluctuations in the current flowing in this circuit. The voltage drop across the resistance 16 varies directly as the current flowing through the resistance and since this voltage drop is impressed on the grid of the tube 17, the potential on the grid is varied accordingly. This varying potential on the grid of the tube results in an oscillatory plate current which is a reproduction of the incoming oscillatory current but which has been considerably amplified. The plate current flows through the primary winding 21 of transformer T' and is induced in the secondary winding 22. The output leads 25 and 26 are connected to the terminals of the secondary winding 22 of transformer T'.

From the foregoing it will be seen that the coupling device according to the invention eliminates any feed-back from the second to the first amplifier and at the same time gives linear response over the entire frequency range. In addition, the size of the battery 15 and resistance 16 can be so chosen with respect to the properties of the photo-electric cell used that the coupling device itself will serve as an additional amplifier.

Although the invention has been illustrated as a coupling means between two amplifying stages, other applications will be apparent to those skilled in the art and many modifications may be made without departing from the spirit of the invention.

Having described the invention, what is thought to be new and is desired to have protected by Letters Patent will be pointed out in the appended claims.

What is claimed is:

1. In combination, two amplifiers, means including a variable source of light and a photo-electric cell for coupling said amplifiers, and means for preventing electrostatic coupling between said two amplifiers.

2. In combination, two amplifying tubes, a neon lamp in the plate circuit of the first tube, a photo-electric cell in the grid circuit of the second tube responsive to the light from said neon lamp, and means for preventing any electrostatic feed-back from the second to the first tube.

3. An amplifier comprising a neon lamp, a photo-electric cell controlled by said lamp, and an electrostatic shield interposed between said lamp and said cell to prevent electrostatic coupling between the two.

4. In combination, two circuits, a coupling device for said circuits comprising a neon lamp in the first circuit and a photo-electric cell in the second circuit, and means for preventing electrostatic coupling between said two circuits.

In witness whereof, I hereunto subscribe my name this 3d day of January, A. D. 1930.

HAROLD J. McCREARY.